US012728444B2

(12) United States Patent
Tandon

(10) Patent No.: US 12,728,444 B2
(45) Date of Patent: Sep. 8, 2026

(54) SYSTEM AND METHOD FOR SORTING OBJECTS

(71) Applicant: OPTISORT, LLC, Horseheads, NY (US)

(72) Inventor: Parag Tandon, Dover, MA (US)

(73) Assignee: OPTISORT, LLC, Horseheads, NY (US)

(*) Notice: Subject to any disclaimer, the term of this patent is extended or adjusted under 35 U.S.C. 154(b) by 0 days.

(21) Appl. No.: 18/587,375

(22) Filed: Feb. 26, 2024

(65) Prior Publication Data

US 2024/0189866 A1 Jun. 13, 2024

Related U.S. Application Data

(63) Continuation of application No. 17/585,206, filed on Jan. 26, 2022, now abandoned, which is a (Continued)

(51) Int. Cl.

*B07C 5/36* (2006.01)
*B07C 5/34* (2006.01)
*B07C 5/342* (2006.01)

(52) U.S. Cl.

CPC ............ *B07C 5/362* (2013.01); *B07C 5/3408* (2013.01); *B07C 5/342* (2013.01); *B07C 5/3425* (2013.01);

(Continued)

(58) Field of Classification Search

CPC ..... B07C 5/3408; B07C 5/342; B07C 5/3422; B07C 5/361; B07C 5/362; B07C 2501/0054; B07C 2501/0072

See application file for complete search history.

(56) References Cited

U.S. PATENT DOCUMENTS 3,854,586 A * 12/1974 Perkins, III .............. A24B 1/04 356/229
5,333,739 A * 8/1994 Stelte ........................ B07C 5/34 209/582

(Continued)

FOREIGN PATENT DOCUMENTS

WO 2019089215 A1 2/2025

OTHER PUBLICATIONS

European Patent Office; Application No. 18872161.7; Dated: Mar. 13, 2024; 4 pages.

(Continued)

*Primary Examiner* — Joseph C Rodriguez

(74) *Attorney, Agent, or Firm* — Barclay Damon LLP

(57) ABSTRACT

A system for sorting objects is provided. For instance, the system includes a first and second sensor for observing the objects before and after sorting and a controller having an action agent module and a learning agent module. The controller updates, by the learning agent module, a policy matrix after sorting previously sorted objects. The policy matrix includes state data of the previously sorted objects including sensor data, an action performed by the sorting actuator, and a sorting score. The controller actuates the sorting actuator, calculates a specific sorting score based on a specific action performed by the sorting actuator, and updates the policy matrix to create an updated policy matrix including updated sorting rules. The updated policy matrix is used in sorting subsequent objects. In another example, the controller loads a policy matrix that was determined incrementally during sorting of previously sorted objects.

15 Claims, 4 Drawing Sheets

Related U.S. Application Data continuation of application No. 16/706,067, filed on Dec. 6, 2019, now Pat. No. 11,247,244, which is a continuation of application No. 15/797,613, filed on Oct. 30, 2017, now Pat. No. 10,512,942.

(52) U.S. Cl.
CPC ...... *B07C 5/363* (2013.01); *B07C 2501/0018* (2013.01)

(56) References Cited

U.S. PATENT DOCUMENTS

| | | | | |
|---|---|---|---|---|
| 5,526,437 | A * | 6/1996 | West | B07C 5/3422 209/939 |
| 7,355,140 | B1 * | 4/2008 | Afsari | B07C 5/366 209/580 |
| 8,406,919 | B1 * | 3/2013 | Hill | G05B 19/41875 700/59 |
| 9,101,963 | B2 * | 8/2015 | Christel | B07C 5/3425 |
| 9,996,745 | B2 * | 6/2018 | Deevi | G01N 21/84 |
| 11,247,244 | B2 * | 2/2022 | Tandon | B07C 5/342 |
| 2004/0052402 | A1 * | 3/2004 | Hamid | B07C 5/3425 382/110 |
| 2015/0375269 | A1 * | 12/2015 | Adams | B07C 5/342 209/576 |
| 2018/0126420 | A1 * | 5/2018 | Goodger | B07C 5/04 |

OTHER PUBLICATIONS

Canadian Patent Office; Canadian Office Action; Application No. 3,081,267; Date of Report: Feb. 2, 2025; 4 pages.

* cited by examiner

SYSTEM AND METHOD FOR SORTING OBJECTS

CROSS-REFERENCE TO RELATED APPLICATIONS

This continuation application claims the benefit of and priority to U.S. patent application Ser. No. 17/585,206, filed Jan. 26, 2022, entitled "SYSTEM FOR SORTING OBJECTS", which is a continuation of U.S. patent application Ser. No. 16/706,067, filed Dec. 6, 2019 and entitled "SYSTEM FOR SORTING OBJECTS," which claims the priority and benefit of U.S. patent application Ser. No. 15/797,613, filed Oct. 30, 2017 and entitled "SYSTEM AND METHOD FOR SORTING OBJECTS," which is incorporated herein by reference in its entirety.

BACKGROUND

The subject matter disclosed herein relates to the sorting of objects, such as glass objects, for example in recycling sorting applications. By way of example, after collection of recyclable glass, a need exists to sort the glass by color so that different colored glass may be effectively processed or sold for reuse. In such applications, even a small amount of foreign material can adversely impact an entire batch of glass of a single color. For example, ceramic pieces can contaminate a batch of glass, and during subsequent processing could explode and damage the batch. In addition, an unacceptable amount of colored glass could make clear flint glass unacceptable for reuse and/or reduce the value of the material, impacting its price in an open market.

Other applications for sorting of objects abound. Fruit, vegetables, manufactured items, mail, and other items are routinely encountered in a state where they are not separated by type. Yet separation is desired so that like objects may be transported or sold separately. Separated objects usually have higher value than the mixed objects.

Automated sorting machines have been contemplated in the industry, and typically operate by using a camera and a sorting actuator, under the guidance of a control system. The control system uses predetermined algorithms and rules to activate the sorting actuator to move passing objects into different bins for collection.

These sorting machines are very sensitive to changes in the flow rate of objects, variations in conveyor belts, deviations in the sizes, shapes or colors of objects, system wear and tear, and other parameters. In addition, the sorting machines are specially designed for one or just a few sorting applications, and are not readily deployed in different applications.

And the sorting systems are very expensive, require expensive conveyor belts, and cannot be readily moved about a facility, such as a recycling or sorting facility. Therefore, a need exists for sorting systems and methods that have improved performance, greater flexibility, and lower cost of ownership.

SUMMARY

A system for sorting objects having different characteristics is provided. The system includes a first sensor, a sorting actuator, a second sensor, and a controller. The first sensor is for observing the objects, including observing first observed characteristics of the objects. The sorting actuator is for sorting the objects based on the first observed characteristics of the objects and using a policy matrix having sorting rules. The second sensor is for observing second observed characteristics of the sorted objects after the sorting by the sorting actuator. The controller includes an action agent module for controlling the sorting actuator and a learning agent module for updating the policy matrix. The controller is configured for the following steps. Updating, by the learning agent module, the policy matrix after sorting previously sorted objects. The policy matrix includes state data of the previously sorted objects including for each of the previously sorted objects the sensor data, an action performed by the sorting actuator, and a sorting score. Actuating, by the action agent module, the sorting actuator to perform one or more actions to sort one or more objects of the objects using the policy matrix having the sorting rules and the state data for the previously sorted objects. Calculating, by the learning agent module, after the sorting of the specific object by the sorting actuator, a specific sorting score based on the at least one specific action performed by the sorting actuator and a second observed characteristic of the specific sorted object of the objects. Updating, by the learning agent module after the sorting of the specific object by the sorting actuator, the policy matrix having the sorting rules to create an updated policy matrix including updated sorting rules, using the state data of the specific object. The updated policy matrix including the updated sorting rules is used in sorting subsequent objects.

In another embodiment, a system for sorting objects is presented. The system includes at least one sensor for observing the objects before and after sorting, an actuator for sorting the objects by performing specific actions using a policy matrix, and a controller for loading a policy matrix. The loaded policy matrix includes sorting rules. The loaded policy matrix and the sorting rules thereof were determined incrementally during sorting of previously sorted objects based on prior observations of the previously sorted objects before and after sorting and state information of a prior actuator during sorting of the previously sorted objects.

In another embodiment, a system or sorting objects is presented. The system includes a sensor for observing the objects before and after sorting, a sorting actuator for sorting the objects using a policy matrix having sorting rules, and a controller having an action agent module for controlling the sorting actuator and a learning agent module for updating the policy matrix. The controller is configured to perform the following steps. Update, by the learning agent module, the policy matrix after sorting previously sorted objects. The policy matrix includes state data of the previously sorted objects including for each of the previously sorted objects the sensor data, an action performed by the sorting actuator, and a sorting score. Actuate, by the action agent module, the sorting actuator to perform a specific action to sort at least one specific object of the objects into two or more bins using the policy matrix having the sorting rules and the state data and observations of the previously sorted objects. Calculate, by the learning agent module, after the sorting of the specific object by the sorting actuator, a specific sorting score based on the specific action performed by the sorting actuator and observations of the specific sorted object of the objects. Update, by the learning agent module after the sorting of the specific object by the sorting actuator, the policy matrix having the sorting rules to create an updated policy matrix including updated sorting rules using the state data and observations of the objects before and after sorting and actions used to sort the objects. The updated policy matrix includes the updated sorting rules and is used in sorting subsequent objects of the objects.

An advantage that may be realized in the practice of some disclosed embodiments of the system or method for sorting objects is that the problem of sorting objects when conditions are variable (flow rate, position, etc.) is solved by observing the result of an sorting actions and updating the sorting methods based on the observation.

The above embodiments are exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

DETAILED DESCRIPTION

Figure 1:
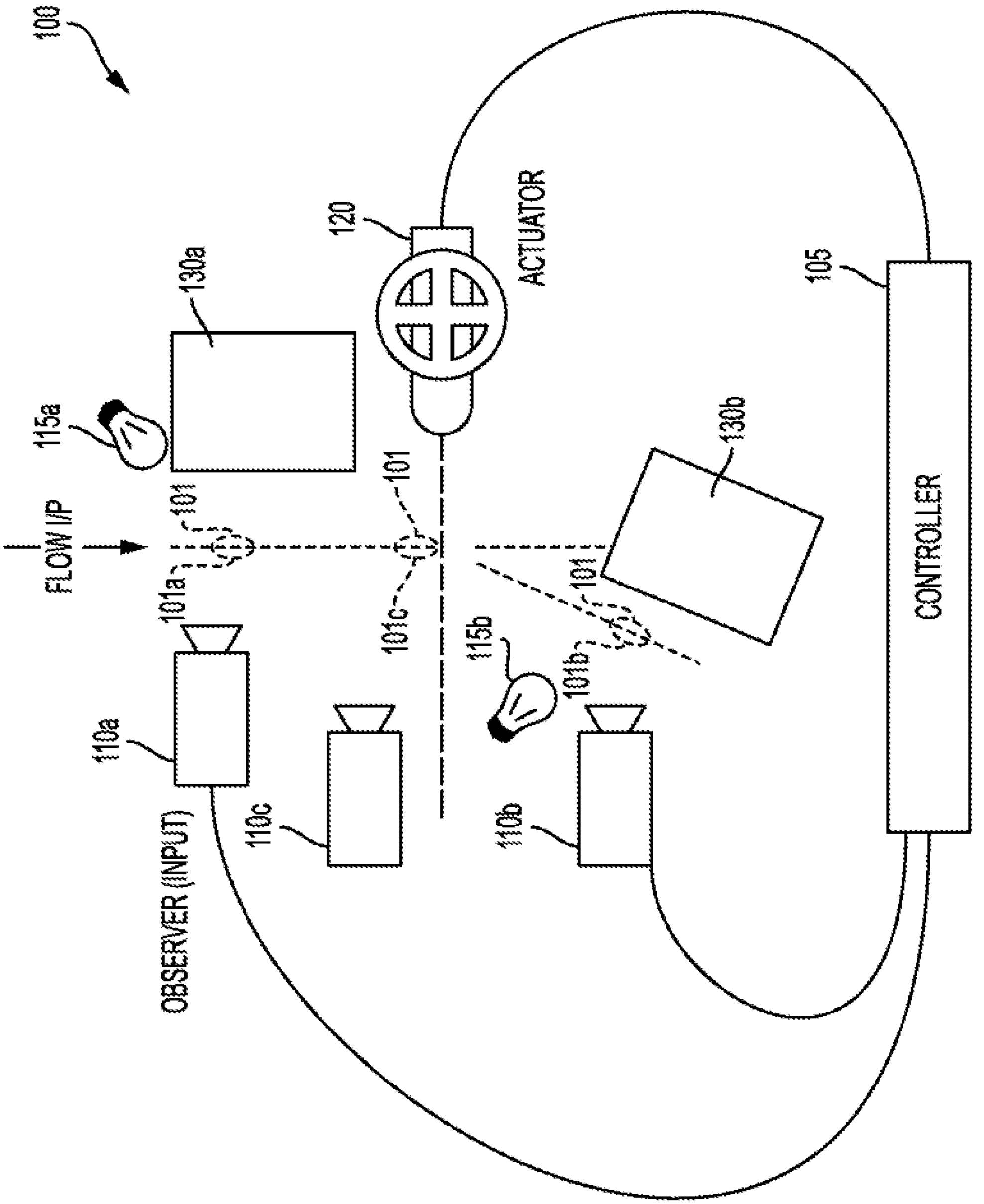
FIG. 1 depicts a system for sorting objects, in accordance with one or more aspects set forth herein.

Embodiments of the disclosed subject matter provide techniques for sorting objects, such as glass objects, e.g., in recycling applications. Other embodiments are within the scope of the disclosed subject matter.

The present disclosure relates, in part, to systems and methods for sorting objects, such as glass objects typically found in the recycling of glass bottles and articles. Advantageously, in one embodiment, the system includes two or more sensors, such as a cameras, that watch the objects as they pass through a sorting actuator. In one application, the glass objects are sorted for color by the actuator. Typically, the sorting actuator may use a puff of air or fluid, or may use a mechanical paddle, magnetic system, etc., to move the objects by different amounts so that the objects land in different bins as the pass through the system. In other applications, different input material may be sorted, and as the systems have a lower cost and smaller system footprint, as objects that vary widely in specification can be sorted. In another example, more than one actuator may be used to sort the objects in multiple stages or steps. In a further example, more than one different sensor of a different type may be employed, for example, a magnetic sensor along with a light sensor, etc.

A first sensor or camera watches the object as it enters the system, for example by free falling from above the camera. The first sensor notes various information about the object, and then feeds that information to a controller, which actuates a sorting actuator to implement movement of the object so that it ends up sorted into a specific bin. Concurrent with the object falling and being sorted, one or more additional sensors carefully watch the sorting process to judge how effective the sorting process was for the particular object. Based on scoring the efficacy of the sorting, the system engages a feedback loop or learning process to fine-tune the sorting rules and parameters so that subsequently sorted objects are more precisely separated by type.

Generally stated, described herein, in one aspect, is a system for sorting glass objects. For instance, the system includes a first sensor, a sorting actuator, a second sensor and a controller. The first sensor may be for observing the objects including colors. The sorting actuator may be for sorting the objects based on the colors. The second sensor may be for observing the sorted objects. The sorting actuator may be actuated by the controller using sorting rules, historical system data and observations of the objects, including the colors of the objects. Sorting scores may be calculated by the controller based on the observations of the sorted objects. The sorting rules may be updated by the controller using the sorting scores.

In another aspect, a system is provided. For instance, the system includes a first sensor, a sorting actuator, a second sensor and a controller. The first sensor may be for observing the objects. The sorting actuator may be for sorting the objects. The second sensor may be for observing the sorted objects. The sorting actuator may be actuated by the controller using sorting rules, historical system data and observations of the objects. The sorting rules may be updated by the controller using the observations of the sorted objects.

In one embodiment, the objects may include selected objects having predetermined colors and the system may learn the sorting rules by sorting the selected objects with the predetermined colors. In another embodiment, updating the sorting rules may include incrementally changing the sorting rules to improve the scoring of the sorting. In a further embodiment, the controller may be configured to save or load the sorting rules.

In one implementation, the system may include a free-fall section to allow the objects to fall past the sorting actuator. In another implementation, the system may include at least one colored background to facilitate sorting by color. In other examples, the first sensor and the second sensor may be the same or different sensors. And, in yet another example, the system may include a third sensor (or more sensors) for observing the sorting of the objects by the sorting actuator.

In a further aspect, a method is provided. Objects are observed, e.g., during free fall or traversal of a conveyor belt. The objects are sorted using sorting rules, historical system data and observations of the objects. The objects are observed. The sorting rules are updated using observations of the sorted objects. In one example, the method includes scoring the sorting and incrementally changing the sorting parameters to improve the scoring of the sorting. In another example, the method includes saving or loading the sorting rules. In a further example, the method includes sorting the objects by color. In such a case, the method may include using at least one colored background to facilitate sorting by color.

FIG. 1 depicts a system 100 for sorting an object 101, which is represented in multiple positions 101*a*-101*c* in the drawings. For instance, in the embodiment of FIG. 1, the system 100 includes a first sensor 110*a*, a second sensor 110*b*, and an optional third sensor 110*c*. The system 110 also includes a controller 105 and at least one sorting actuator 120 (depending on the application, multiple stage sorting actuation may be employed). The sensors 110*a*-110*c* send sensor data to the controller 105, and the sorting actuator

120 is controlled by the controller 105 using a combination of sorting rules and sensor data.

In addition, light sources 115*a*, 115*b* may be used in conjunction with the respective sensors 110*a*, 110*b* to facilitate detection of colors of the objects 101. In conjunction with the light sources 115*a*, 115*b*, backgrounds 130*a*, 130*b*, having varying colors, may be used to effectuate the color detection. For example, color detection may use the reflection properties of colored material. If trying to remove red material, and using red light, green and blue material may show as very dark (close to black). The detection algorithm can then efficiently remove dark objects and sense only red objects. Similarly, since glass refracts, using a blue background and ambient white light, red glass may be detected by camera as black (very dark).

By way of overview, in one example, the object 101 free falls through the system 100, and first passes, at position 101*a*, by the first sensor 110*a*. The first sensor 110*a* feeds sensor data to the controller 105, which may use the sensor data to determine various characteristics of the object 101. Based on the sensor data and currently operable sorting rules, the controller 105 may actuate the sorting actuator 120 when the object 101 passes through position 101*c*. The sorting rules may include fixed sorting parameters as well as variable rules that are learned over the course of time by the system 100. Further details, including mathematical details of the sorting rules are set forth below with respect to FIG. 2.

In different embodiments, and depending on the application, the sorting actuator 120 may be a solenoid type, servo type, water valve type, or air type. Examples of the foregoing are as follows: a linear motion solenoid available from Shenzhen Zonhen Electric Appliances Co., of China; a PowerHD servo available from HuiDa RC International Inc., of China; a solenoid water valve available from Sizto Tech Corporation of Palo Alto, California; or an MHJ solenoid air valve available from Festo AG of Esslingen am Neckar, Germany.

In one example, the sensors 110*a*-110*c* may be cameras, such as color cameras, infrared sensors, ultraviolet sensors, X-ray sensors, laser sensors or light data and ranging sensors, or combinations thereof. Such sensors are available from vendors such as Logitech, of Newark, California or Kayeton Technology Company of Shenzhen, China. In another example, the sensors 110*a*-110*c* may be infrared or ultraviolet cameras, such as those available from Fuji of Tokyo, Japan. In further examples, X-Ray or Light Data and Ranging (LIDAR) sensors may be used for sensors 110*a*-110*c*. The controller 105 may be or include multiple components, such as processors or graphics processors available from Intel or Nvidia, both of Santa Clara, California.

Figure 2:
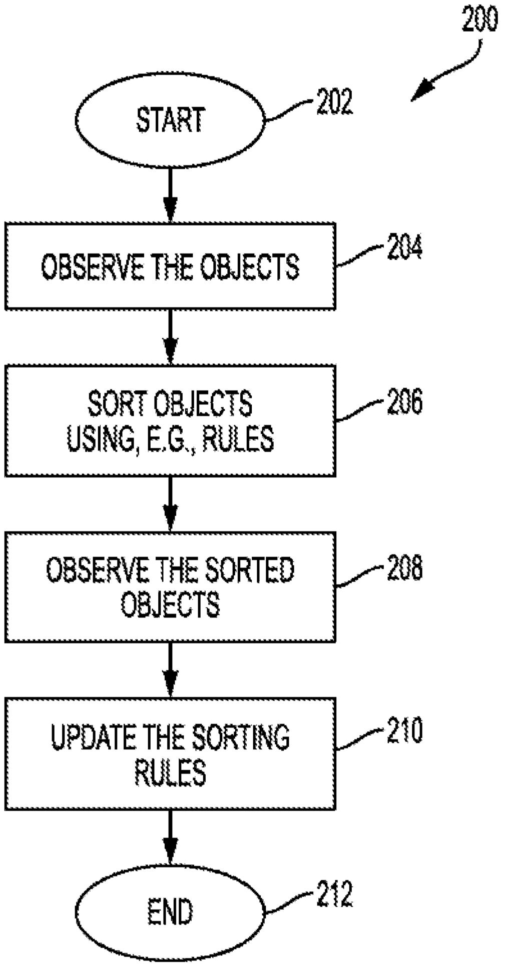
FIG. 2 depicts a method for sorting objects, in accordance with one or more aspects.

FIG. 2 is a flowchart depicting a method 200 for sorting objects. The method 200 can be implemented by one or more programs running on the system 100, in particular running on the controller 105. Further details of the computing, storage, and related functions of the system 100, for enabling operation of the method 200, is set forth below with respect to FIG. 3.

In the embodiment of FIG. 2, the method 200 at block 202 starts, for example, in response to auto-detecting a flow of objects into the system 100 (FIG. 1) for sorting.

The concept of historical system data is now introduced. At any given point in time, the aggregate of all system data, such as prior sorting actions, prior object observations, etc., may be termed the historical system data. Of course, as time progresses, the historical system data continues to grow based upon new sorting actions and new observations of the objects, using one or more sensors such as cameras. In one example, the concept of pre-sort system state may more precisely be defined as including all relevant historical system data that is known at a given point in time right before a sorting action takes place. In such a case, the concept of post-sort system data may more precisely be defined as including all historical system data this is known at the point in time right after a sorting event takes place, e.g., after sorting actuation, the observation from sensors and the action are added to the history and become new state of the system. Generally speaking, the historical system data makes up the state of the system. A controller of the system may maintain a policy matrix that includes each known state, each action, and each average reward (e.g., represented by a score) expected when moving from a known state using a known action. This policy matrix or state table informs controller what is the best action to take given the current state. Initially, while the controller is still building this matrix or table, the controller may be configured to make a percentage of random action to learn which actions might be more advantageous. Also, as environment parameters change, for example the actuator slows, the reward will start showing negative values, resulting in the controller re-evaluating and updating the best action for a given state. After a few minutes of runtime, controller will refresh the policy matrix, and system will start performing the sorting as expected. Advantageously, this configuration allows the system to adapt as per changing conditions, because the system continues to modify its behavior based on the learning techniques disclosed herein, rather than adopting a fixed behavior.

Initially, the method 200 at block 204 observes the objects. By way of example, observations may include size, shape, color, opacity, material composition, moisture, temperature, or any other physical characteristic of the objects. In addition, observations may include velocity, acceleration, position (e.g., in three-dimensions), or any other kinetic information related to the objects. Further, the observations may include electrical data, magnetism data, chemical composition, vibration, sound, or any other such data related to the objects or the environment (e.g. ambient lighting conditions, wind speed and direction, temperature, etc.). In one example, the observations are fed to the controller 105 (FIG. 1), where it may be used and stored for later use.

Note that different sensors may be needed for different environments. For instance, acoustic, chemical, electrical, magnetic, radio, environmental, weather, moisture, humidity, flow, fluid velocity, radiation, particle, navigation, optical, pressure, displacement, acceleration, gyroscopic, force, density, proximity, and other sensors may be used to distinguish different objects, either alone or in combination.

Continuing, the method 200 at block 206 sorts the objects using sorting rules, historical system data and observations of the objects. For instance, the controller 105 may use the observations, along with the sorting rules, including various parameters of the sorting rules, to determine how to sort the specific object. This may then be translated into a specific actuator instruction, so that the actuator causes the object to move by specified amount so that it falls into an appropriate sorting bin.

In one embodiment, the method 200 loads the sorting rules described above from a storage device. The stored sorting rules may have been learned over the course of time during other sorting runs, or may have been determined by an expert operator designing the specific parameters to be used in a specific sort, or some combination thereof. For instance, a thumb drive storage device including the sorting rules may be plugged into the system so that the system operates and behaves in a particular manner for a particular application. In one case, such pre-loaded configuration files, including details of the sorting rules, may be developed for use in glass sorting, metal sorting, plastic sorting, produce sorting, mail sorting, or any other sorting application.

After or during sorting, the method 200 at block 208 observes the objects. Observations of the objects after the sorting are then included in the aggregate known system data at a given point in time.

For example, the same parameters that were observed before sorting may now be measured after sorting, including physical, kinetic, chemical, or other data of the sorted object. The method 200 may observe the sorting process itself, e.g., by observing the sorting actuator activate and effectuate a movement of the object from its initial position. Alternately or additionally, the method 200 may observe the object after the sorting actuator has already performed its function, and provide a final state data observation of the object. And, the method and system advantageously allows for more sensor readings to take place, so that a third, fourth, or more sensors may provide data of the object. In some examples, a single sensor may track the object through the multiple stages, and observation data before, during and after sorting action (or actuation). In other applications, multiple discrete sensors may be deployed for convenience or simplicity. In some embodiments, the first sensor may be of one type, e.g., a camera, and the second sensor may be of a different type, e.g., a laser or a LIDAR sensor.

Next, the method 200 at block 210 updates the sorting rules using the observation data of the objects. In one example, updating the sorting rules may include defining a score function, and scoring the sorting on an object-by-object basis. The sorting rules may be incrementally changed after each object has been sorted, so that subsequent objects are sorted by sorting rules that have learned from the prior sorting operations.

After sorting numerous objects, the sorting rules currently in force may be saved to the system so that the learning can be reused when next sorting similar objects under similar conditions. Advantageously, sorting rules, once loaded, can then continue to benefit from the learning system and feedback afforded by the second (or more) sensors used by the method.

Finally, the method 200 at block 212 ends, when a batch of objects has been sorted. In one example, the method 200 may be run through batches of test items of known variation, which could be used to train the system to learn how to sort particular items. For instance, a first, preselected, batch of objects (e.g., a bucket full) having varying sizes and varying shades of green may be fed into the system, and the system may be operated in a learning mode in which the system observes all the objects and learns that they are to be considered green objects. Similar training could be done to teach the system about brown glass and clear flint glass. Then, once the system learns about these objects, the system can be used to sort an entire truck load of recycling glass into different bins for green, brown, and clear flint glass.

Because such training could be done under real world conditions, variations in the drop height of the free-fall, average glass size in the batches, etc., can be automatically adjusted for by the system due to being trained by relatively small batches of glass. Of course, to the extent that conditions continue to repeat, the learning from the training, and the actual sorting results, can be saved as described above, and a library of sorting rules may be created for use in different environments.

In addition to object sorting system, other applications of the techniques disclosed herein include upgrades to existing sorting machines to improve their performance and/or provide flexibility to use operating condition or material outside the specifications of the current system. Further, another application is for an intelligent irrigation system, that constantly monitors, using one or more sensors, such as soil, temperature, pH level, plant/tree health/growth sensors, and uses actuators to release needed ingredients (e.g., water/fertilizer) at an individual plant/tree basis at a large scale. For example, the system can learn about local grub infestations and handle it without any manual or rule based intervention. In such a case, the concepts have been expanded beyond sorting and actuation of sorting to include a control system that includes observation with sensors, actuation of any process, and scoring functions.

In one example, Q-learning, which is a model free reinforcement learning technique, is used by the system. In one example, the State-action-reward-state-action (SARSA) algorithm for learning a Markov decision process policy, is used by the system. A person having ordinary skill in the art will understand the details of using Q-learning or SARSA, to take the historical data at a given time (t−x) and use it to determine an action at time (t).

Next, working examples of mathematical algorithms that may be employed in different embodiments of the system or method are set forth below.

In one example that does not use a feedback loop, $A_t = f(C_{t-x}(S_{t-x-y}))$, where:

$A_t$ are action(s) taken at time t;

$f$ is a function that determines the action(s) to take;

$C_t$ is a function that determines the categories of objects found;

$S_t$ represents all accumulated sensor inputs at time t;

x is the time delay between categorization being complete and the action being taken; and y is the time delay between the sensor output being available and the categorization being complete.

In one example of the techniques disclosed herein, $$A'_t = f'(C'_{t-x}(S'_{t-x-y}), C'_t(S'_t), A'_t, R_t(S'_t)),$$ where:

$A'_t$ are action(s) taken at time t;

$f'$ is a function that determines the action(s) to take;

$C'_t$ is a function that determines the categories of objects found;

$S'_t$ represents all accumulated sensor inputs at time t; and

R't represents the results of the previous action.

For instance, $f'$ may be periodically changed to maximize the total overall result R' on an ongoing basis, so as to learn to sort better.

In one example, given the continual changes in sorting objective, lighting condition, input material, speed and other environmental factors, continually changing the function that determines the action to take has significant advantages over using a fixed action function.

By way of further explanation, a model-free reinforcement learning technique such as Q-learning may be employed as the above stated algorithm. Specifically, Q-learning may find an optimal action-selection policy for any given decision process. An action-value function may be learned that provides the expected utility of taking a given action in a given state, and thereafter the optimal policy may be followed. Such a policy may be rule-based, in that the agent selects actions based on the current state. After learning an action-value function, the optimal policy may be based on selecting the action with the highest value in each state. Advantageously, the present technique allows comparison of the expected utility of the available actions without requiring a precise mathematical model of the environment. In other words, through the selection of the reward function, informed by the multiple camera views and data, the system is invariant to the specific details of flow rate, separation of objects, etc., because it is always learning by experience rather than through an initial model. This allows as a further advantage the handling of stochastic transitions and rewards, leading to an optimal policy through the trial and error technique.

Figure 3:
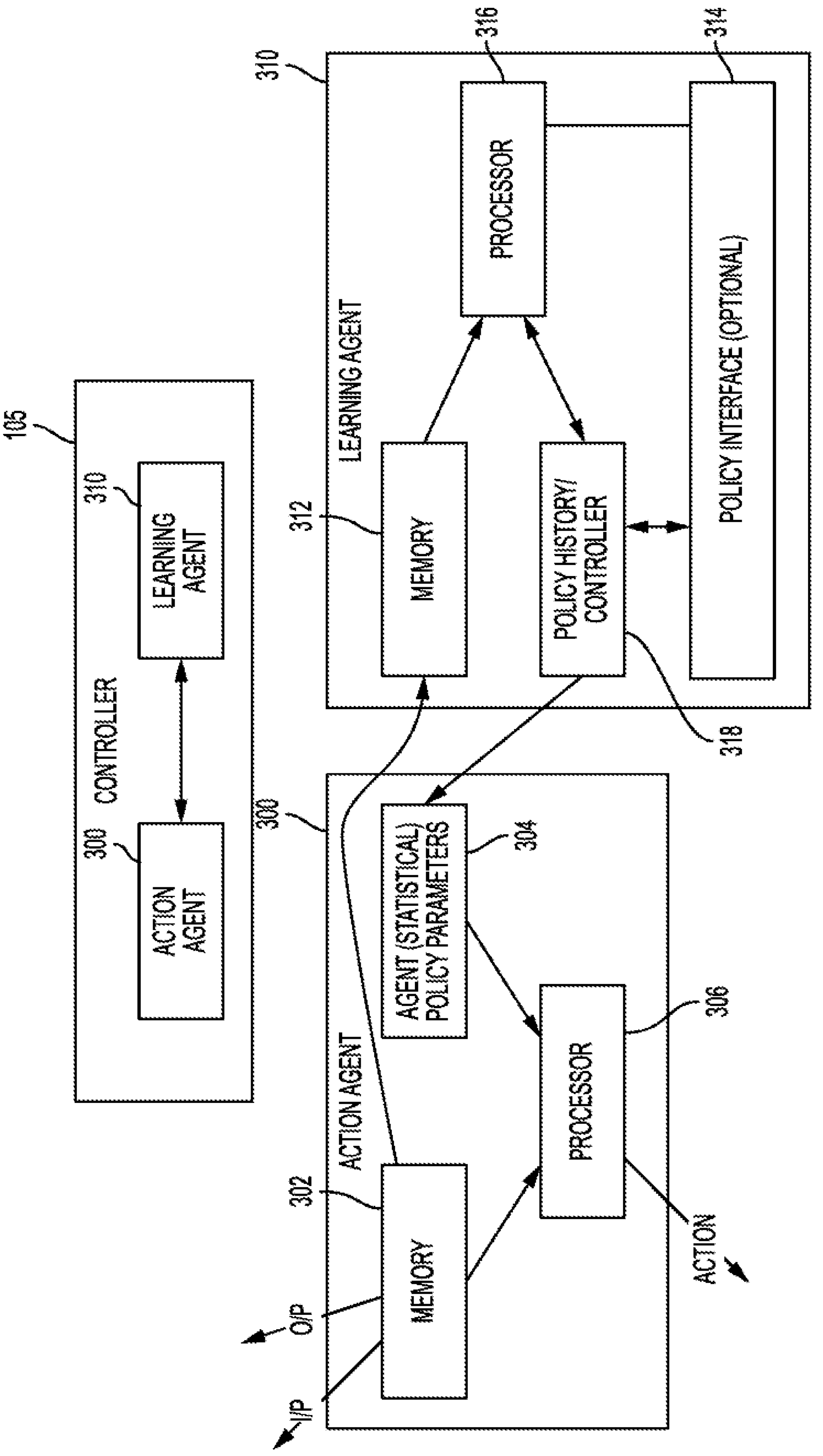
FIG. 3 depicts further details of the system of FIG. 1, in accordance with one or more aspects set forth herein.

FIG. 3 depicts further details of the controller 105 (FIG. 1). In the embodiment of FIG. 3, the controller 105 includes an action agent 300 and a learning agent 310. The action agent 300 may be used to actuate the sorting actuator 120 (FIG. 1). The action agent 300 may include a memory 302, statistical agent policy parameters 304 and a processor 306. The memory 302 may be used to store the current and historical object data, input and output data, action history, etc. The parameters 304 may include the sorting rules, parameters, etc. The processor 306 may be used to compute the algorithms described above to implement the sorting rules, applying the loaded sorting rules or policies to the current state (e.g., the current object to be sorted).

In addition, the learning agent 310 may include both the learning functions and context, as well as the ability to store and load the sorting rules. For example, the learning agent 310 may include a memory 312, an optional policy interface 314, a processor 316 and a statistical policy/history controller 318. The memory 312 may include a larger store of historical data related to sorting of objects, similar to the memory 302 of the action agent 300. The policy interface 314 may include a variety of functions, including the ability to reset the system to the last known good state, begin learning, or save or load the sorting rules including sorting parameters. The processor 316 may include the ability to find statistical patterns in the sorting history in order to set the best parameters for choosing actions that result in correct sorting of the objects.

Figure 4:
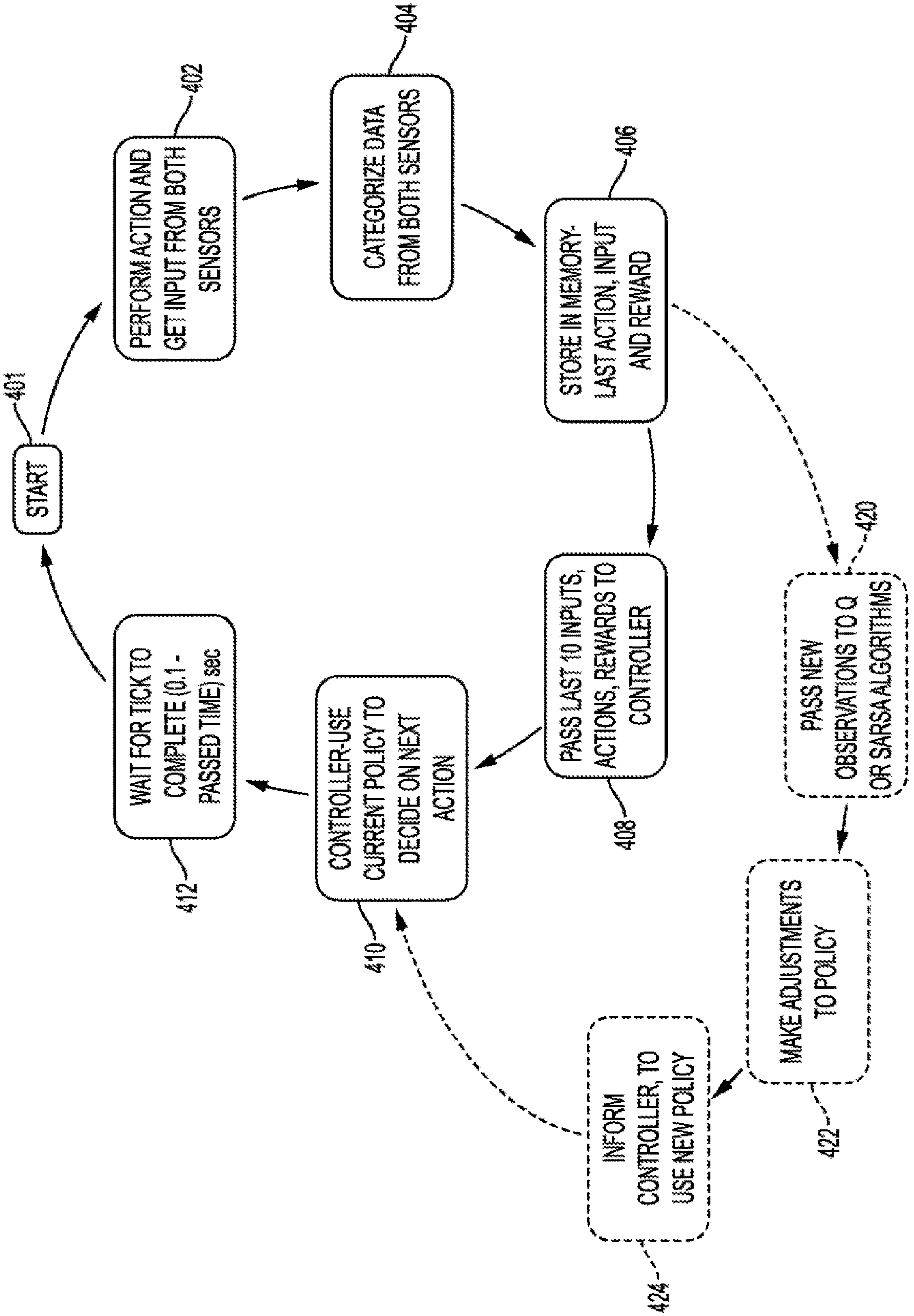
FIG. 4 depicts an example of operation of the system of FIG. 1, in accordance with one or more aspects set forth herein.

FIG. 4 depicts an example of operation of the system 100 of FIG. 1. The system 100 at step 402 performs actions and gets input from both a first and second sensor. Next, the system 100 at step 404 categorizes the observation data of the object from both of the sensors, including information obtained before and after sorting. Next, the system 100 at step 406 stores the last action, input data, and reward data in memory. Next, the system 100 at step 408 sends the last N (e.g., 10) input data, actions and rewards to the controller for processing. Next, the system 100 at step 410 decides programmatically on the next action. Finally, the system 100 at step 412 waits for the time interval or tick (e.g., 100 milliseconds) to pass, and returns to the start 401. As may also be seen, the system 100 at step 420 passes new observations to the algorithms. Next, the system 100 at step 422 adjusts the policy, including the sorting rules. Finally, the system 100 at step 424 informs the controller of the new sorting rules and policies.

In another aspect, the system may be trained in order to perform a specific application. One specific training sequence is as follows:

First, start with a small amount (e.g., 100 pounds) of green glass that is broken and in various sizes, as would be found in the final mixture to be sorted. Next, pass the green glass through the system, operating in a command mode of "learn color that is the objective to be sorted" specifying that green glass is to be identified and classified.

As the green glass passes through the system, the system may find the characteristics of the input color using color histogram to find HSV (hue-saturation-value) or RGB (red-green-blue) color boundaries. In a variation, size and color could be determined as the objective.

Next, 100 pounds of other material, except green glass, that will be found in the final mixture to be sorted, may be passed through the system, operating in a command mode of "learn the color that is not the objective to be sorted." Again, the system can then find the characteristics of the input color using color histogram to find HSV or RGB color boundaries to ignore or reject. And, similarly, in a variation, size and color could also be varied.

Next, the mixed material may be filled in the hopper and the feeder may be started to start the mixed glass flow through the system. The system may be commanded to start the first input and second reward sensors or cameras, as well as the actuator. A user of the machine may observe periodically to see if the machine has learned, by monitoring the output bins.

After such a trial run sequence has been performed, and has yielded material in good, sorted order, the full configuration may be saved by the system, for example to a non-volatile memory storage device such as a thumb drive. Now, the system may run as a normal, steady state operational system.

Alternatively, subsequently the system may be transported and set up in a different location, and may be initialized using the saved configuration, e.g., by inserting the thumb drive and loading the preconfigured settings which include the historical data. Next, the hopper may be filled and the feeder, sensors, actuators, etc., may be started to sort the items.

In another example, during steady state operation, troubleshooting steps may be used to automatically correct misfiring that is detected by the sensors (or by an operator). In such a case, if the misfiring takes place for greater than a predetermined time period, a bump command may be initiated, that can increase the propensity of the system to make adjustment to the current configuration and bring it to optimized state faster. If the bump command does not restore the system to an operational steady state within a specified time frame, then the system may automatically or manually be restarted.

Aspects of the system and method for sorting objects, as described above, offer numerous advantages. For instance, the use of two or more sensors, which may be cameras, improves the technology of sorting by facilitating learning from experience. The use of multiple sensors of different types may also be used, for example by combining camera sensors with magnetic sensors. In such a manner. Also, sensors with different testing times may be used. For example, during the sorting process, there may be a sensor that is quick to give data on a specific object, but the post-sorting sensor may act in a more bulk manner to give an indication of the overall efficiency of the sorting. Because the system can be trained by feeding it material of different types (which it can then learn to differentiate), numerous other applications, beyond sorting recycling or goods are available. For instance, mail sorting, luggage handling at airports, factory assembly line monitoring, and other like applications can benefit from an overall system that uses multiple sensors and includes a learning algorithm as described herein.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In view of the foregoing, embodiments of the invention sort objects, such as glass objects. A technical effect is to enable the separation of mixed items so that they can be separately processed. As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A system for sorting objects having different characteristics, the system comprising:

a free-fall sorting section, the free-fall sorting section for sorting objects as the objects fall;

a first sensor for observing the objects, including observing first observed characteristics of the objects;

a sorting actuator, after the free-fall sorting section, for sorting the objects based on the first observed characteristics of the objects and using a policy matrix comprising sorting rules;

a second sensor for observing second observed characteristics of the sorted objects after the sorting by the sorting actuator; and a controller comprising an action agent module for controlling the sorting actuator and a learning agent module for updating the policy matrix, the controller being configured to update, by the learning agent module, the policy matrix after sorting previously sorted objects, wherein the policy matrix includes state data of the previously sorted objects including for each of the previously sorted objects the sensor data, an action performed by the sorting actuator, and a sorting score, wherein the learning agent module performs reinforcement learning to update the policy matrix using a reward function derived from the sorting score, actuate, by the action agent module, the sorting actuator to perform one or more actions to sort one or more objects of the objects using the policy matrix comprising the sorting rules and the state data for the previously sorted objects, wherein the sorting actuator sorts the one or more objects such that a resulting batch of objects has a different threshold amount of objects of the first observed characteristics relative to objects of the second observed characteristics, calculate, by the learning agent module, after the sorting of the specific object by the sorting actuator, a specific sorting score based on the at least one specific action performed by the sorting actuator and a second observed characteristic of the specific sorted object of the objects, and update, by the learning agent module after the sorting of the specific object by the sorting actuator, the policy matrix comprising the sorting rules to create an updated policy matrix including updated sorting rules, using the state data of the specific object, wherein the updated policy matrix including the updated sorting rules is used in sorting subsequent objects;

wherein the learning agent module aggregates pre-sort system states of prior sorting actions by the sorting actuator and prior object observations by the first and second sensors and uses the pre-sort system states to perform the sorting of a first set of the objects;

wherein the learning agent module aggregates system states of sorting actions of the first set of the objects by the sorting actuator and object observations by the first and second sensors of the first set of the objects and uses the system states of the sorting actions of the first set of the objects to perform the sorting of a second set of the objects;

wherein the policy matrix is initialized with no predefined sorting rules and the reinforcement learning occurs entirely from the aggregated system states of the produce objects;

wherein the system trains the policy matrix using a first small batch of produce objects and subsequently applies the updated policy matrix to sort larger production batches of produce objects; and wherein the objects comprise produce objects.

2. The system of claim 1, wherein the first sensor and the second sensor is a single type of sensor.

3. The system of claim 1, wherein the objects include selected objects having predetermined characteristics and the system learns the sorting rules by sorting the selected objects with the predetermined characteristics.

4. The system of claim 1, wherein updating the sorting rules comprises incrementally changing the sorting rules to improve the scoring of the sorting.

5. The system of claim 1, wherein the controller is configured to save or load the sorting rules.

6. The system of claim 1, further comprising a free-fall section to allow the objects to fall past the sorting actuator.

7. The system of claim 1, further comprising at least one background to facilitate sorting.

8. The system of claim 1, wherein the first sensor and the second sensor are cameras.

9. The system of claim 1, further comprising a third sensor for observing the sorting of the objects by the sorting actuator.

10. The system of claim 1, further comprising a plurality of subsystems each for sorting a subset of the objects, each subsystem of the plurality of subsystems comprising one pre-sorting sensor, one sorting actuator and one post-sorting sensor, wherein one of the plurality of subsystems comprises the first sensor, the sorting actuator and the second sensor, wherein the usage of the plurality of subsystems facilitates parallel sorting of the objects.

11. The system of claim 1, further comprising a conveyance for conveying at least some of the sorted objects to a second actuator for sorting the objects based on different observed characteristics of the objects using different sorting rules.

12. A system for sorting objects, the system comprising:

sensors for observing the objects before and after sorting;

a free-fall sorting section, the free-fall sorting section for sorting objects as the objects fall;

a sorting actuator, after the free-fall sorting section, for sorting the objects using a policy matrix comprising sorting rules;

a controller comprising an action agent module for controlling the sorting actuator and a learning agent module for updating the policy matrix;

wherein the controller is configured to:

update, by the learning agent module, the policy matrix after sorting previously sorted objects, wherein the policy matrix includes state data of the previously sorted objects including for each of the previously sorted objects the sensor data, an action performed by the sorting actuator, and a sorting score, wherein the learning agent module performs reinforcement learning to update the policy matrix using a reward function derived from the sorting score;

actuate, by the action agent module, the sorting actuator to perform a specific action to sort at least one specific object of the objects into two or more bins using the policy matrix comprising the sorting rules and the state data and observations of the previously sorted objects, wherein the sorting actuator sorts the one or more objects such that a resulting batch of objects has a different threshold amount of objects of the first observed characteristics relative to objects of the second observed characteristics;

calculate, by the learning agent module, after the sorting of the specific object by the sorting actuator, a specific sorting score based on the specific action performed by the sorting actuator and observations of the specific sorted object of the objects; and update, by the learning agent module after the sorting of the specific object by the sorting actuator, the policy matrix comprising the sorting rules to create an updated policy matrix including updated sorting rules using the state data and observations of the objects before and after sorting and actions used to sort the objects, wherein the updated policy matrix includes the updated sorting rules and is used in sorting subsequent objects of the objects;

wherein the learning agent module aggregates pre-sort system states of prior sorting actions by the sorting actuator and prior object observations by the first and second sensors and uses the pre-sort system states to perform the sorting of a first set of the objects; and wherein the learning agent module aggregates system states of sorting actions of the first set of the objects by the sorting actuator and object observations by the first and second sensors of the first set of the objects and uses the system states of the sorting actions of the first set of the objects to perform the sorting of a second set of the objects;

wherein the policy matrix is initialized with no pre-defined sorting rules and the reinforcement learning occurs entirely from the aggregated system states of the produce objects;

wherein the system trains the policy matrix using a first small batch of produce objects and subsequently applies the updated policy matrix to sort larger production batches of produce objects; and wherein the objects comprise produce objects.

13. The system of claim 12, wherein the controller is further configured to score the sorting and incrementally change the sorting parameters to improve the scoring of the sorting.

14. The system of claim 12, wherein the controller is further configured to save the sorting rules.

15. The system of claim 12, wherein the controller is further configured to load the sorting rules.

* * * * *